United States Patent [19]
Alderman

[11] Patent Number: 5,770,295
[45] Date of Patent: Jun. 23, 1998

[54] PHASE CHANGE THERMAL INSULATION STRUCTURE

[75] Inventor: Robert J. Alderman, Canyon Lake, Tex.

[73] Assignee: Energy Pillow, Inc., Sequin, Tex.

[21] Appl. No.: 475,876

[22] Filed: Jun. 7, 1995

Related U.S. Application Data

[63] Continuation-in-part of Ser. No. 118,567, Sep. 9, 1993, Pat. No. 5,626,936.

[51] Int. Cl.$^6$ .................................................. B32B 3/06
[52] U.S. Cl. .............................. 428/68; 126/618; 165/46; 428/71; 428/72; 428/76; 428/192; 428/320.2; 428/323; 428/330; 428/913
[58] Field of Search ................................. 428/68, 72, 71, 428/76, 192, 320.2, 323, 330, 913; 126/618; 165/46

[56] References Cited

U.S. PATENT DOCUMENTS

| | | | |
|---|---|---|---|
| 907,099 | 12/1908 | Trowbridge | 220/428 |
| 2,835,483 | 5/1958 | Lindsay | 263/41 |
| 2,876,634 | 3/1959 | Zimmerman et al. | 62/457 |
| 2,893,704 | 7/1959 | Passman | 257/250 |
| 2,926,508 | 3/1960 | Moon | 62/457 |
| 3,148,676 | 9/1964 | Truog et al. | 126/246 |
| 3,463,140 | 8/1969 | Roller, Jr. | 126/246 |
| 3,603,106 | 9/1971 | Ryan | 62/457 |
| 4,253,983 | 3/1981 | Blanie | 252/70 |
| 4,259,401 | 3/1981 | Chahroudi et al. | 428/306 |
| 4,290,247 | 9/1981 | Alderman . | |
| 4,299,715 | 11/1981 | Whitfield et al. | 252/74 |
| 4,482,010 | 11/1984 | Cordon | 165/53 |
| 4,587,279 | 5/1986 | Salyer et al. | 523/206 |
| 4,856,294 | 8/1989 | Scaringe et al. | 62/259.3 |
| 4,931,333 | 6/1990 | Henry | 428/76 |
| 5,233,840 | 8/1993 | Scaringe | 62/77 |
| 5,290,904 | 3/1994 | Colvin et al. | 428/68 |

OTHER PUBLICATIONS

*Wallboard With Latent Heat Storage For Passive Solar Applications*, R. J. Kedl, Oak Ridge National Laboratory Report ORNL/TM–11541, May, 1991.

*What are the Potential Benefits of Including Latent Storage in Common Wallboard?*, T. K. Stovall, J.J. Tomlinson, pp. 318–325, Journal of Solar Energy Engineering, vol. 117, Nov., 1995.

*Solar Heat Storage: Latent Heat Materials, vol. I: Background and Scientific Principles*, pp. 41–55, 153–222; Editor, George A. Lane, Ph.D., 1983.

"What's in Store for Phase Change?" by David Eissenberg and Charles Wyman, *Solar Age*, May 1980.

"Solar–Heat Storage System" by David Scott, Mar. 1982.

(List continued on next page.)

*Primary Examiner*—Nasser Ahmad
*Attorney, Agent, or Firm*—Thomas, Kayden, Horstemeyer & Risley

[57] ABSTRACT

An insulation system (10, 180) is placed in ceilings or walls of buildings which are typically exposed on one side thereof to relatively large temperature changes and on the other side to relatively small temperature changes. The insulation system (10, 180) includes a first inner layer of insulative material (18, 184) and a second outer layer of insulative material (19, 186), with an intermediate layer of phase change material (20, 182) sandwiched therebetween. The phase change material undergoes a change of phase between solid state and liquid state during the course of a typical day due to the outside temperature ranging higher and lower than the phase change temperature. When undergoing a change of phase, the phase change material maintains a constant phase change temperature, thereby moderating the temperature gradient across the inner layer of insulative material (18, 184). Thus, the heat transfer across the inner layer of insulative material (18, 184) is minimized and the temperature of interior space (22) is more efficiently maintained at a relatively constant temperature.

12 Claims, 11 Drawing Sheets

OTHER PUBLICATIONS

"New Heat Storage Material", *Sun*, Mar. 1980.

"Solar Salts" by Richard Stepler, *Popular Science*, Mar. 1980.

"Clever Places to Hide Heat–Storing Salts" Erik H. Arctander, *Popular Science*.

"Phase Change Materials as Energy Storage Media" by John O'C. Young, *Sunworld*, vol. 6, No. 6, 1982, pp. 169–171.

"Thermal Performance . . . Modleing" by Mohammed M. Farid and Atsushi Kanzawa, *Jrnl. of Solar Energy Engineering*, May 1989, vol. 111, pp. 152–157, Arctander, *Popular Sci.* .

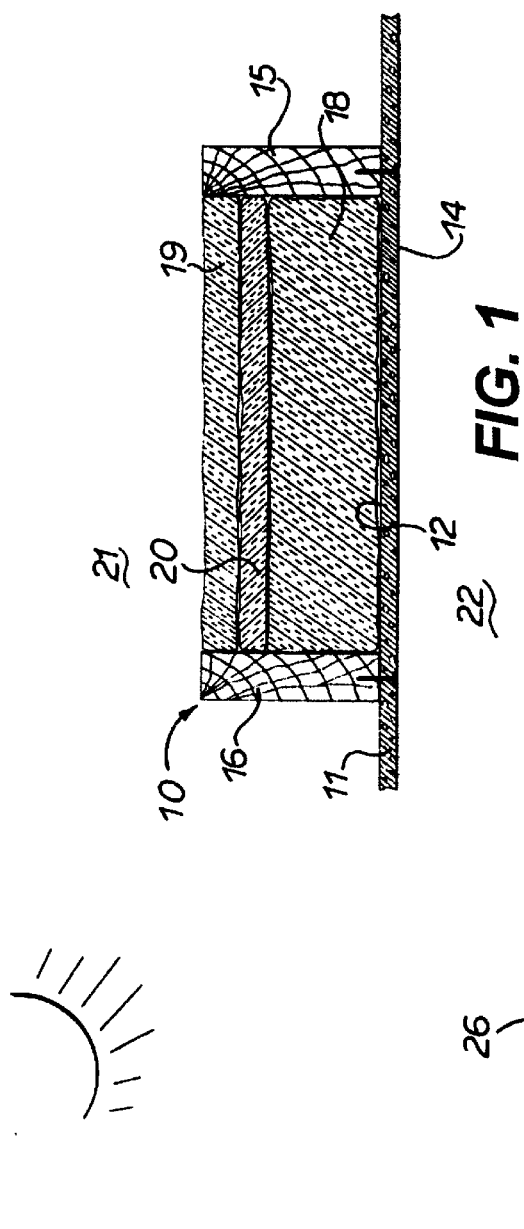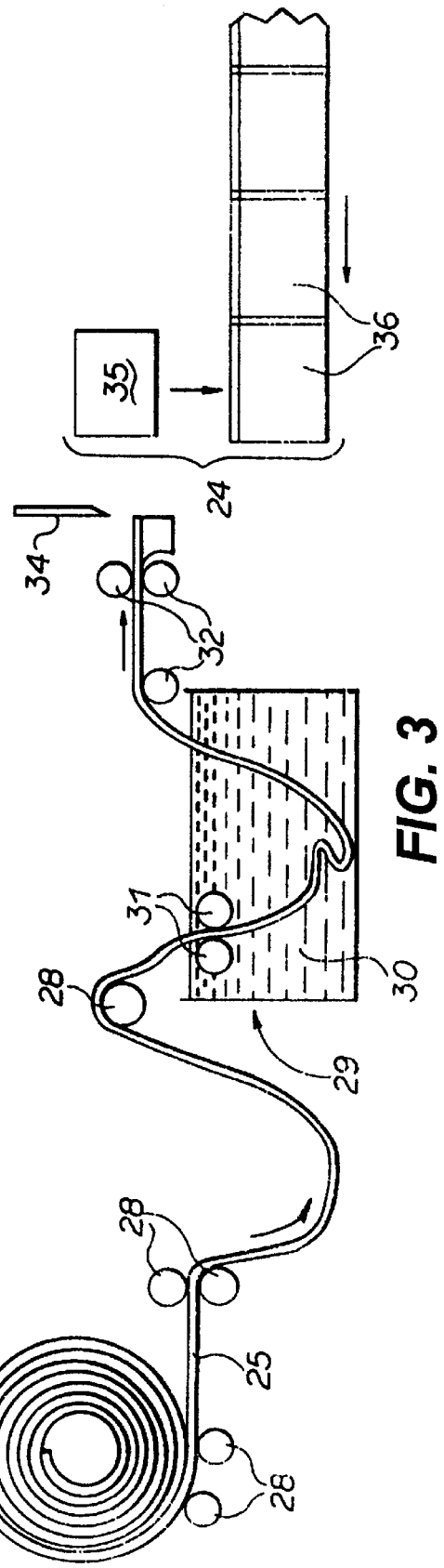

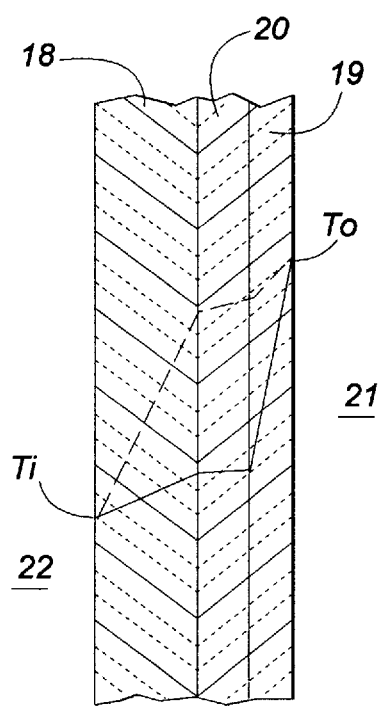 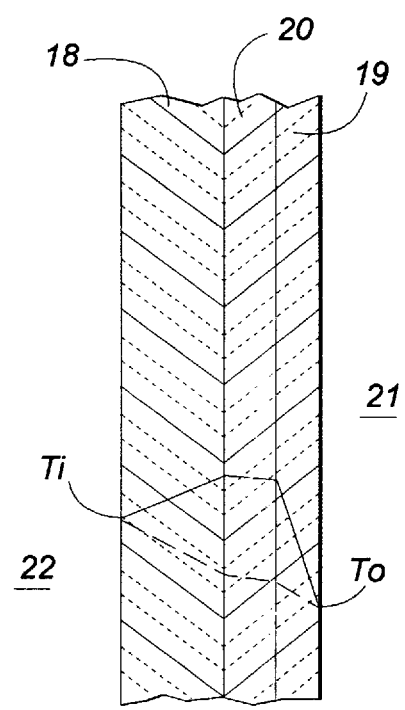
FIG. 2A  FIG. 2B

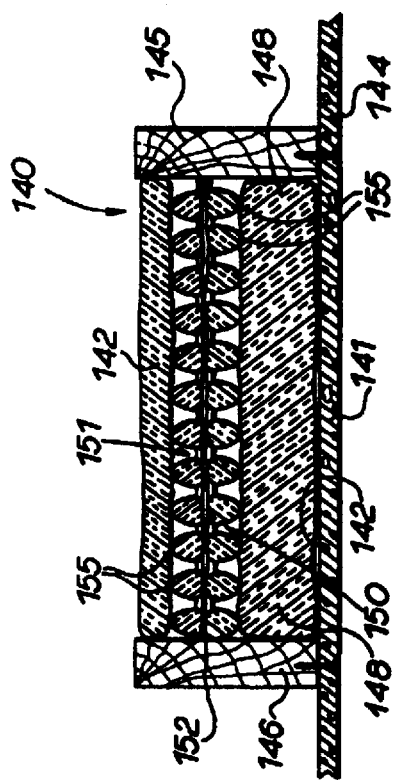
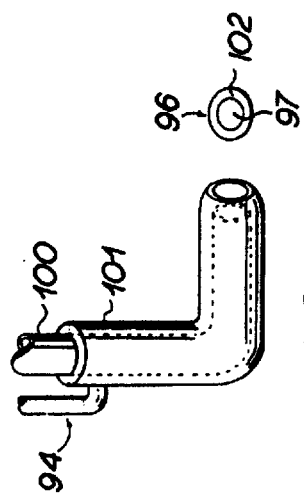
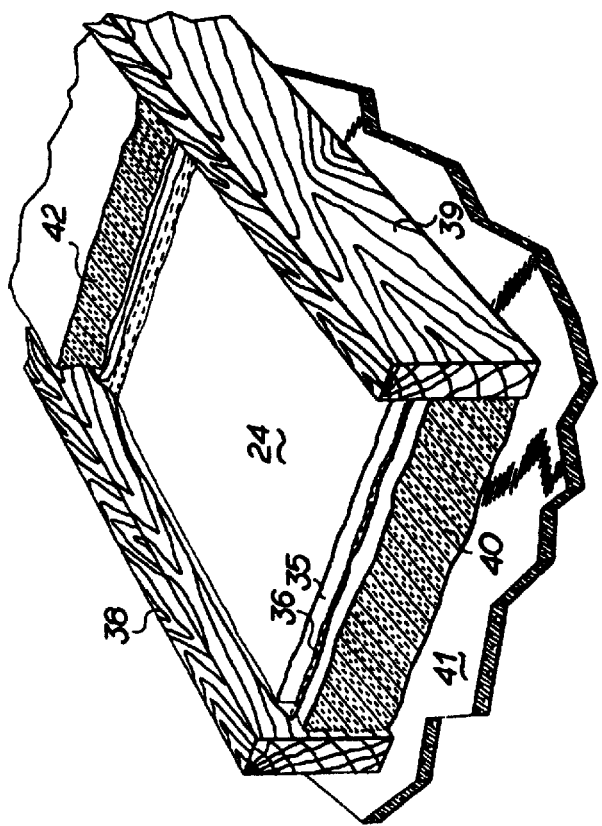
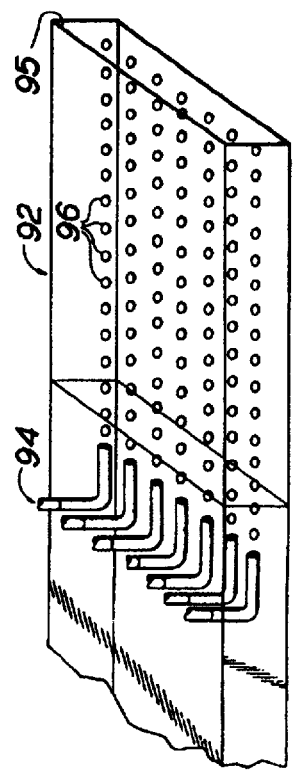

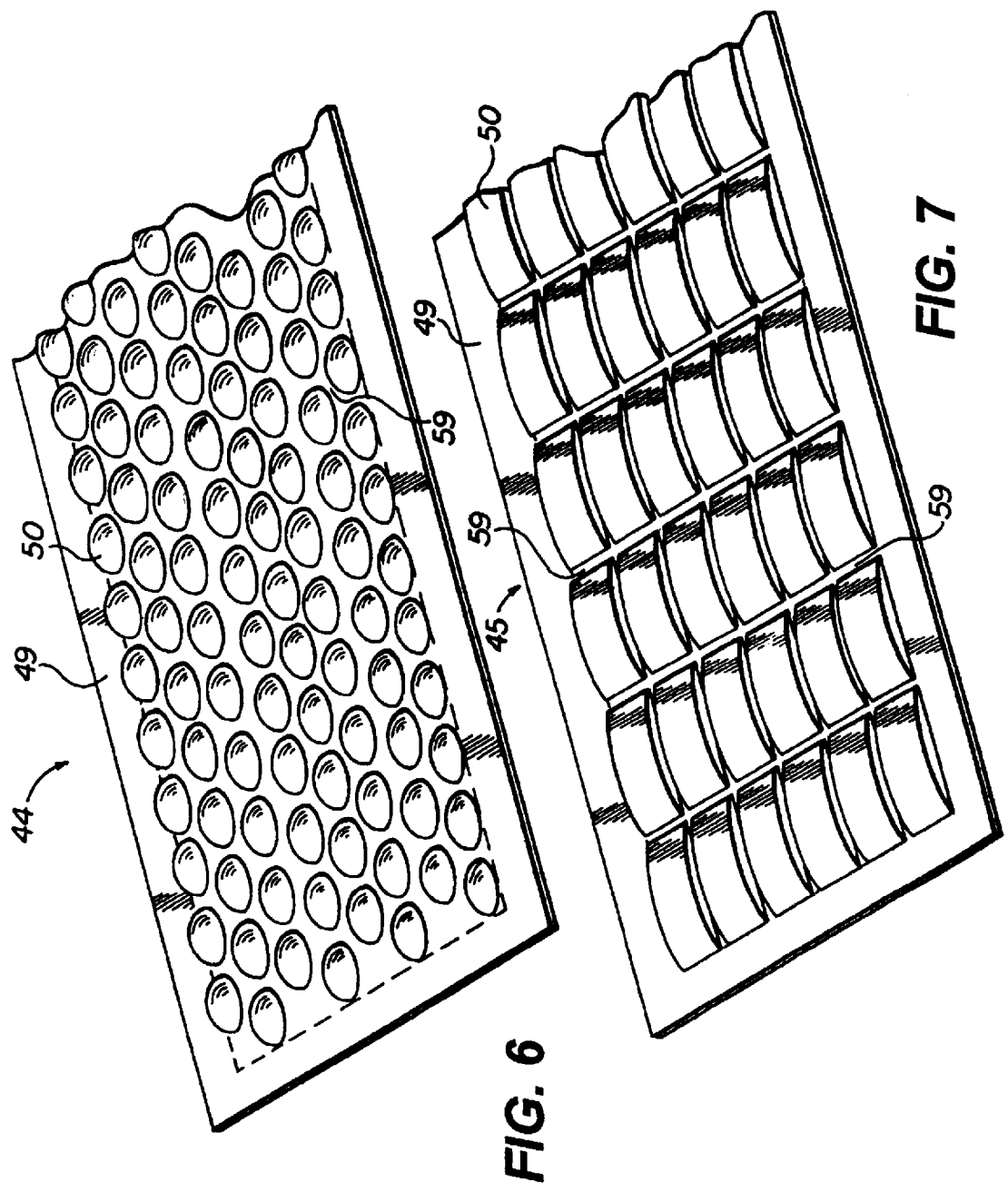

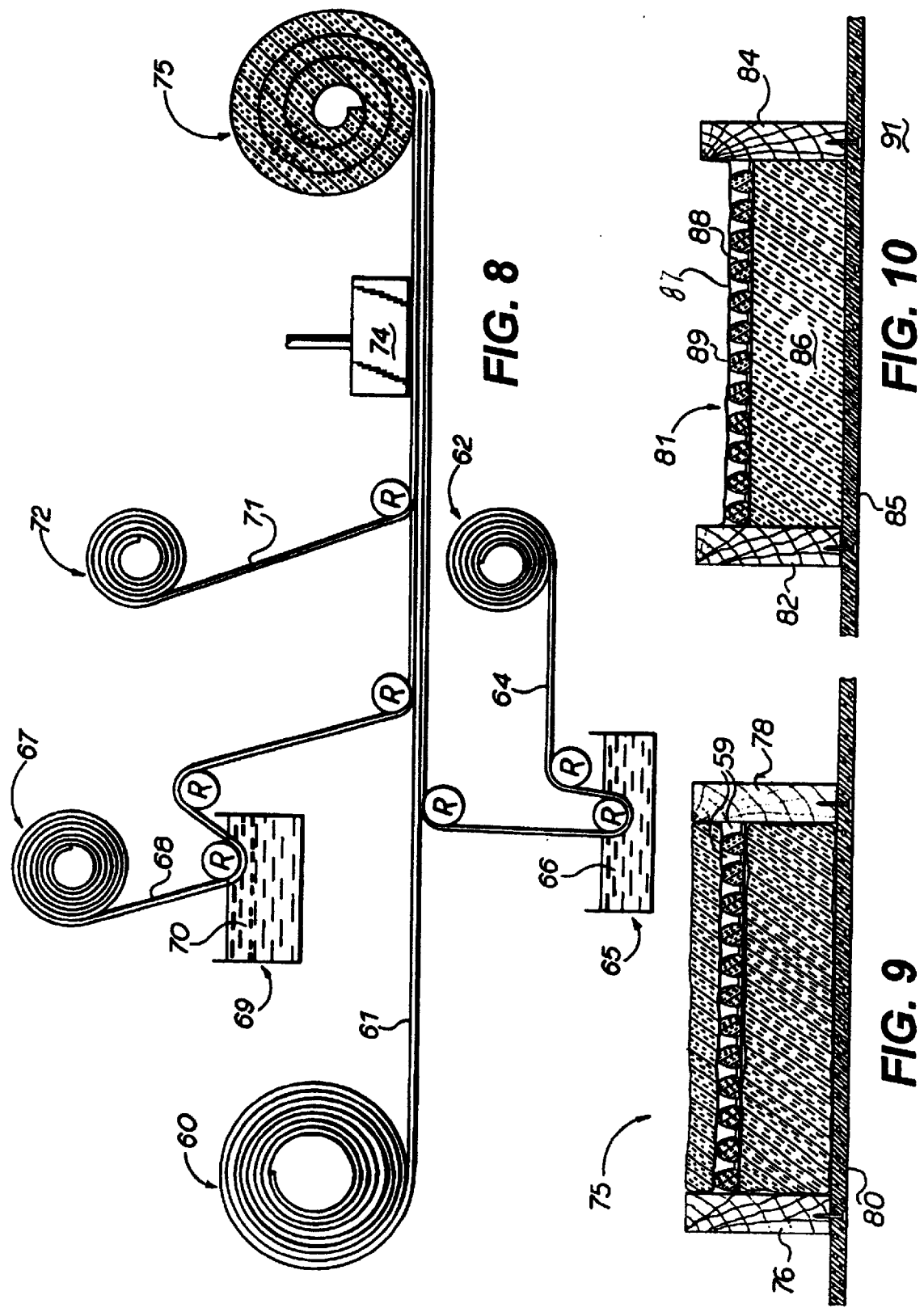

PHASE CHANGE THERMAL INSULATION STRUCTURE

The present application is a Continuation-In-Part application of a co-pending patent application entitled "Phase Change Insulation System," filed on Sept. 9, 1993, and having Ser. No. 08/118,567 now U.S. Pat. No. 5,626,936.

FIELD OF THE INVENTION

The present invention relates generally to a thermal insulation structure for placement between a relatively constant temperature space and a variable temperature space which in a typical time period reaches temperatures higher than and lower than a predetermined temperature. The thermal insulation structure is suitable for placement in the ceiling or walls of buildings, particularly in an overhead ceiling adjacent an attic or in a vertical external wall, both of which are exposed on one side to relatively large temperature changes and on the other side to constant or relatively small temperature changes.

BACKGROUND OF THE INVENTION

Building structures constructed for human occupancy typically maintain the temperature and humidity conditions inside the building at a comfortable level for its occupants with the use of heating and air conditioning equipment controlled by a thermostat, whereas the temperature outside the building varies with atmospheric conditions. In a twenty-four hour day during most days of a year in most inhabited locations of the world, the temperature of a roof or of an external wall that faces the sun typically ranges to levels below and above the desired indoor temperature which is in the mid seventies, Fahrenheit.

The roof or exterior wall structure of a typical modern building includes at least one layer of thermal insulation material which retards the transfer of heat between the inside and outside surfaces. If the insulation material present in the typical insulated wall or ceiling is sufficient, the transfer of heat during the high temperature portion of the day from the hot outside portion of the wall or ceiling to the lower inside temperate portion of the ceiling will be slow enough so that the air condition unit of the building can adequately compensate for any undesirable increase in temperature. Later during the same day the exterior portion of the wall and ceiling will cool during the low temperature portions of the day, usually to a temperature that is lower than the inside temperature of the building. In a like manner, the heating unit of a sufficiently insulated building should be able to adequately compensate for any undesirable decrease in temperature.

The rate at which heat will flow through a wall or ceiling into or out of a room maintained at a substantially constant temperature is dependent upon at least two factors: the temperature gradient between the inside of the structure and the outside of the structure, and the efficiency with which the ceiling or wall conducts heat. In order to reduce the rate of heat transfer across the ceiling or wall into or out of the building structure, a greater quantity of and a more efficient insulating material can be utilized. Such insulating materials can include, for example, fiberglass, mineral wool, urethane foams, cellulose and other materials well known in the art.

However, the cost of producing and installing the most efficient and most suitable insulating materials for a well-insulated ceiling or wall structure is rather high. Typically, the structure above the ceiling of a house includes a roof structure having several layers, such as an exterior layer of shingles and felt, several intermediate layers of wood boards, parallel joists, and wall board panels attached thereto and extending horizontally for forming a ceiling, and layers of insulation dispersed about the joists and panels. Similarly, the exterior wall structure of a building includes several layers such as an exterior layer of brick, wood or other siding, an inner layer of wall board, and an intermediate layer of insulation. Though conventional insulating materials can be effective at reducing heat transfer through the walls or ceilings, etc., conventional insulation materials are often times not practical because they are expensive, bulky to handle, difficult to install, and in some instances are not very effective for specific commercial and private applications. Also, some structures are not built with enough space to accommodate the quantity of insulation necessary to adequately insulate the structure.

It has been known in the past to use phase change materials to store heat by causing a change in the "state" or "phase" of the materials from a solid to a liquid. Generally, the heat applied to a phase change material ("PCM") in a solid state is absorbed by the PCM resulting in an increase in the temperature of the PCM. As the temperature of the PCM reaches its phase change temperature, that is the temperature at which the PCM material changes from a solid state to a liquid, the PCM stops increasing in temperature and substantially maintains a constant temperature at its phase change temperature, "consuming" the heat being applied thereto and storing it as latent heat. Latent heat is the heat gained by a substance without any accompanying rise in temperature during a change of state. In essence, it is the amount of heat necessary to change a substance from the solid state to the liquid state. Once the phase change material has completely changed to a liquid state, the temperature of the PCM begins to rise again as the applied heat is now absorbed as sensible heat.

In reverse, as the PCM drops in temperature, the sensible heat which was consumed by the change to a liquid phase and stored as latent heat is released at the phase change temperature of the PCM as the PCM changes into its solid state. As before, the PCM maintains a substantially constant temperature at its phase change temperature while giving up the stored latent heat of liquification as it turns into its solid state. Some examples of PCM's for isothermally storing and releasing heat as describe above are paraffin, calcium chloride hexahydrate, sodium carbonate, and Glauber's salt.

An example of using PCM as a temperature moderator is found in U.S. Pat. No. 2,876,634 to Zimmerman et al. which shows a thermodynamic tea cup having an intermediate layer of phase change materials. The tea cup provides a means for effecting a rapid cooling of heated liquids to a satisfactory temperature for maintaining the contents of the cup at that temperature. Another U.S. Pat. No. 3,463,140 to Rollor, Jr. discloses a double walled container, defining an annulus. Paraffin is inserted in the annulus so that when a hot liquid is poured into the container, some of the heat from the liquid is transmitted to and stored in the paraffin as the paraffin fuses at a temperature which is approximately the optimum temperature for drinking hot liquids. Furthermore, U.S. Pat. No. 4,603,106 to Ryan illustrates another thermodynamic food and beverage container. The Ryan container includes a heat storage material disposed therein for regulating the temperature of the food and beverage within the container. Therefore, the prior art known to the inventor shows relatively small containers for containing and maintaining the temperature of a small quantity of material.

One of the main problems with using PCM's in a practical application for isothermally storing and releasing heat in a large structure such as a vertical in a wall of a building is containing the quantity of PCM's properly dispersed over a large area. Another problem with using PCM's in a practical sense is containing the PCM when in its liquid phase in an optimum position whereby it will perform its phase changing between its liquid and solid states continually and in an evenly distributed manner. Particularly, when the material liquifies, the liquid has an ability to move under the influence of gravity or to become absorbed into an adjacent material. If dislocated while in its liquid phase, the PCM might be dislocated from its optimum position for its next phase change occasion. Also, if the PCM is not retained in one position but is allowed to leak or move to other areas, the concentration of the phase change material in the water admixture is likely to change and is likely to cause a change in the performance of the phase change material. In addition, certain PCM's when exposed to the atmosphere will either dry out and evaporate or absorb excessive moisture, either of which can inhibit or prevent the PCM from performing its intended function of temperature moderation.

Therefore, while the latent heat absorption and release capabilities of certain PCM's have been known and used in limited ways in the past, no known wide spread practical and commercial use has been made of PCM's in conjunction with insulation materials for insulating living spaces from one another, such as the ceiling area or exterior walls of a building structure from the atmosphere. It is to the provision of such a phase change insulation system that the present invention is primarily directed.

BRIEF DESCRIPTION OF THE INVENTION

Briefly described, the present invention comprises a thermal insulation structure for placement between a relatively constant temperature space and a variable temperature space which in some uses of the invention reaches temperatures higher than and lower than the temperature of the constant temperature space. In particular, a thermal insulation structure in accordance with the present invention is especially well suited for placement in a ceiling or wall structure of a building or dwelling as insulation for maintaining the interior lining space at a relatively constant temperature. An integral part of the insulation structure is a layer of PCM usually disposed between two layers of insulative material. The PCM functions as a means for latent heat absorption and release in a ceiling or wall structure, which functions as a heat transfer barrier or moderator between a hotter side and a cooler side of the ceiling or wall structure during the change of phase of the PCM. The PCM maintains an approximately constant temperature at its phase change temperature which temporarily reduces the transfer of heat across the ceiling or wall structure, and therefore increases the efficiency of the overall insulation structure.

More particularly, the invention comprises a thermal insulation structure for an attic space, for example, for placement between joists adjacent the surface of the ceiling panels and for placement in an interior portion of an external wall structure of a building. Typically, a relatively constant temperature is maintained on the interior surfaces of the building by heating and air conditioning systems, and the temperatures of the outside surfaces in a twenty-four hour period typically are lower in the night hours and higher in the day hours than the temperature of the inside surfaces.

In a preferred embodiment, the insulation structure of the present invention includes a first thicker layer of insulative material, a second thinner layer of insulative material mounted parallel to and in overlying relationship with respect to the first layer, and an intermediate layer of PCM sandwiched between the facing surfaces of the first thicker and the second thinner layers of insulative material. The first thicker layer of insulative material usually is placed adjacent the constant temperature space such as the sheetrock or other interior panel of a ceiling or internal panel of a wall, and the second thinner layer of insulative material is placed facing the variable temperature space, such as the exterior surface of the building. In addition, the PCM in the intermediate layer changes between a solid state and a liquid state at a predetermined phase changing temperature, preferably at a temperature close to and slightly above the temperature of the constant temperature space.

The PCM is selected from materials with characteristics that will change phase between the anticipated highest and lowest temperatures of the variable temperature space over a particular time period. For example, in an attic or in an exterior wall structure of a building in the course of a twenty-four hour day, the PCM will change from a solid state to a liquid state and back to a solid state as the outside temperature increases from below to above and back to below the phase changing temperature. Therefore, the PCM positioned between the other layers of insulation completes a cycle within the course of a typical twenty-four hour day. It is this dynamic change in temperature of the variable temperature space which brings about the advantageous performance characteristics of the PCM as a temperature modulator, as explained in greater detail below.

As the PCM within the layers of insulation changes state, it maintains its substantially constant phase changing temperature although it is absorbing heat from or giving up heat to the outside surface of a ceiling or the outside surface of a wall structure. Therefore, during the hot part of a day for example, as the heat from a space outside of the wall or ceiling structure transfers through the outer layer of insulation to the PCM, the intermediate layer of PCM moderates the transfer of heat to the inner layer of insulation and the panels of the ceiling or the wall structure by the constant temperature conversion of sensible heat to latent heat during the period in which the PCM is changing from a solid state to a liquid state. Because of the PCM's ability to maintain a relatively constant temperature during a phase change, the temperature gradient across the inner layer of insulation can be reduced or moderated to an diminutive amount by selecting a PCM with a phase change temperature close to that of the controlled temperature space. Thus, since the PCM intermediate layer and the relatively constant temperature space are at near the same temperature during the phase change of the PCM from a solid to liquid state, virtually no heat will be transferred across the inner layer of insulation from the variable temperature space to the controlled temperature space.

Once the PCM completely changes to a liquid state, the sensible heat being absorbed by the PCM begins to increase its temperature and heat will begin to be transferred from the PCM, across the inner layer of insulative material, to the inner surface of the building adjacent the controlled temperature space. However, until this happens, the thermal characteristics of the PCM reduces the transfer of heat to the relatively constant temperature space by moderating the temperature gradient across the inner layer of insulative material, thereby reducing the load required on the air conditioning system of the building.

During the cooler temperature portions of the day, when the outside temperature falls to a level below the desired temperature of the temperature controlled space and below the phase changing temperature, the opposite phenomenon occurs as the PCM begins to change from a liquid state to a solid state. While the heat is released from the PCM through the outer layer of insulation material and to the cooler outside environment, the PCM cools down to its phase change temperature where it remains as it changes phase to a solid, even though the outside temperature may have fallen well below the phase change temperature and possibly even below the inside temperature of the building. As before, the PCM moderates the temperature across the inner layer of insulation, and consequently, more efficiently insulates the inside space of the dwelling from the much colder outside temperature as the PCM changes from a liquid state to a solid state.

After the PCM has become solidified, its temperature of the PCM begins to drop again and heat will transfer from the warmer inside space to the cooler outside space, and eventually the inside surface of the ceiling or wall structure may become cooler, requiring the furnace or other heat source to maintain the temperature inside the building at the desired level.

Therefore, the constant temperature phase changes of a PCM in conjunction with the layers of insulative material enables the temperature gradient or difference across the inner layer of insulative material adjacent the wall or ceiling material to be moderated, and thus, less affected by the extreme higher and lower outside temperatures as the PCM changes from solid to liquid or vice versa. This effectively reduces the peak load required on a heating and cooling system(s) for the building. Accordingly, is important to select a PCM with a phase change temperature within the high and low temperatures of the variable temperature space to ensure that the PCM experiences phase changes from a solid to a liquid and then back to a solid, all within a twenty-four hour cycle.

Several different methods can be utilized to apply the PCM to the intermediate layer when constructing the insulation structure. For instance, the PCM can be applied in its liquid phase to an absorptive carrier sized and shaped so that the carrier can be encased in a bag for conveniently inserting between the first and second layers of insulative material. In another embodiment, the PCM in its liquid phase can be injected between a flat layer of impermeable material and a layer of expandable material so as to form a bubble or pocket having the PCM material therein. Similarly, liquid PCM can be injected into small compartments between two flexible sheets of material, such as Mylar®. In the above described embodiments and several of the following embodiments, the PCM intermediate layer can include air spaces which help the insulation system to become more effective, wherein the air spaces retard the movement of heat through the first or second insulative layers.

Another embodiment of the PCM intermediate layer comprises small globules of PCM material encapsulated into small individual beads by another material, such as oil, tar, epoxy, etc. The small beads can thereby be dispersed on top of the first insulative layer of material and be adhesively attached to the first and the second layer of insulative material.

PCM can also be used in an insulating board, wherein small pellets of PCM are applied to wall board as it is extruded or otherwise fabricated, such as styrofoam, which functions to hold the PCM pellets in position in a wall structure. For example, the PCM can be applied to chopped cellulose, to the dimples in styrofoam material, or to other materials which carry the PCM pellets. Thus, the styrofoam material functions to surround and capture the phase change particles in a permanent structure for placement as an intermediate layer of a wall material in a wall structure, and when the phase change particles melt, the phase change liquid will be contained in its desired position within the styrofoam.

Yet another embodiment of the intermediate layer of PCM comprises an uniform coating of PCM on at least one of the facing surfaces of a first thicker and second thinner layer of insulative material. The PCM can be applied in a liquid state directly to the layer of insulative material by spraying the PCM, rolling the PCM using a roll applicator, soaking a separate support layer to be sandwiched between the two insulative layers, or soaking a portion of a layer of insulative material in a PCM bath. Alternatively, the PCM can be applied in a solid state to the layer of insulative material, then heated to a temperature above the phase change temperature of the particular PCM so that the PCM changes to a liquid state, and thereby uniformly coating the insulative material. The particular insulative material chosen for the support layer to which the PCM is applied should be sufficiently porous and the particular chosen PCM sufficiently adhesive such that the PCM is retained in a substantially uniform spatial dispersement within the intermediate layer.

Alternatively, rather than utilizing two separate sheets of support material for the respective first and second layers, a single batt of insulative material can be utilized by horizontally splitting the batt with a longitudinal cut spanning the width of the batt, thereby forming two layers separated by a slit. The PCM and an adhesive can then be applied at the slit to form the intermediate layer and to bond the two layers back together.

Thus, it is an object of the present invention to provide an improved thermal insulation structure for placement between a relatively constant temperature space and a variable temperature space, such as in the ceilings and wall structures of a dwelling or building structure.

Another object of the present invention is to provide a phase change thermal insulation structure for use in an attic space or in a wall structure between the interior living space having relatively constant temperature space and the outdoor environment which has a temperature range extending lower and higher than the phase change temperature, wherein an intermediate layer of PCM changes between a solid state and a liquid state at a phase changing temperature between the anticipated highest and lower outside temperatures, so that the heat transferred to the inside surface of the ceiling or wall structure is moderated so that the relatively constant temperature space is less affected by the extreme higher or lower temperatures of the outside space.

Another object of the present invention is to provide processes for expediently producing an efficient large area thermal insulation structure including an intermediate layer of PCM.

Another object of the present invention is to provide a thermal insulation structure for placement in a building structure including a layer of PCM that uses its latent heat of liquification and solidification to alternately absorb heat from and give up heat to the atmosphere as the temperature of the atmosphere rises above or drops below the phase changing temperature of the PCM.

Another object of the present invention is to provide a thermal insulation structure for use in a building structure which has improved thermal insulation properties and which is expedient and inexpensive to produce and to install.

A more complete understanding of the present invention will be had by those skilled in the art, as well as an appreciation of additional advantages, which will become apparent upon reading the detailed description of the preferred embodiment and examining the drawings, a brief description of which follows.

BRIEF DESCRIPTION OF THE DRAWINGS

FIG. 1 is an end cross sectional view of adjacent ones of the attic joists in a ceiling structure of a typical house, in accordance with a preferred embodiment of the present invention, illustrating a first embodiment of the phase change thermal insulative structure;

FIG. 2A and 2B are schematic diagrams for a typical phase change thermal insulation structure, showing the approximate temperatures from the hot side, across a wall, to the cool side of the wall.

FIG. 3 is a side elevational view of a method for forming sacks containing an absorptive material soaked in PCM which forms a part of the insulative structure;

FIG. 4 is a detail perspective view of the PCM product positioned intermediate the layers of conventional batt insulation and positioned in the structure of a ceiling, showing the layers of insulation partially removed;

FIG. 6 is a perspective view of the finished product of FIG. 5;

FIG. 7 is a perspective view illustrating another embodiment of a PCM intermediate insulation layer showing a sheet of interconnected small bags filled with PCM;

FIG. 8 is a side elevational view of a method for forming a phase change thermal insulation structure using sheet insulation and including an intermediate layer of PCM material;

FIG. 9 is an end cross sectional view of adjacent attic joists with the phase change thermal insulation structure shown in position in a ceiling environment;

FIG. 10 is an end cross sectional view similar to FIG. 9, and wherein the phase change thermal insulation structure does not include the upper overlapping layer of insulation material;

FIG. 11 is a perspective view of a method for forming an insulation system having PCM pellets encapsulated by a sealant;

FIG. 12 is a detailed illustration of one of the nozzles of FIG. 11;

FIG. 15 is an end cross sectional view of adjacent attic joists with two PCM intermediate layers of FIG. 6, shown in position in a ceiling environment;

DETAILED DESCRIPTION OF THE PREFERRED EMBODIMENT

Figure 5:
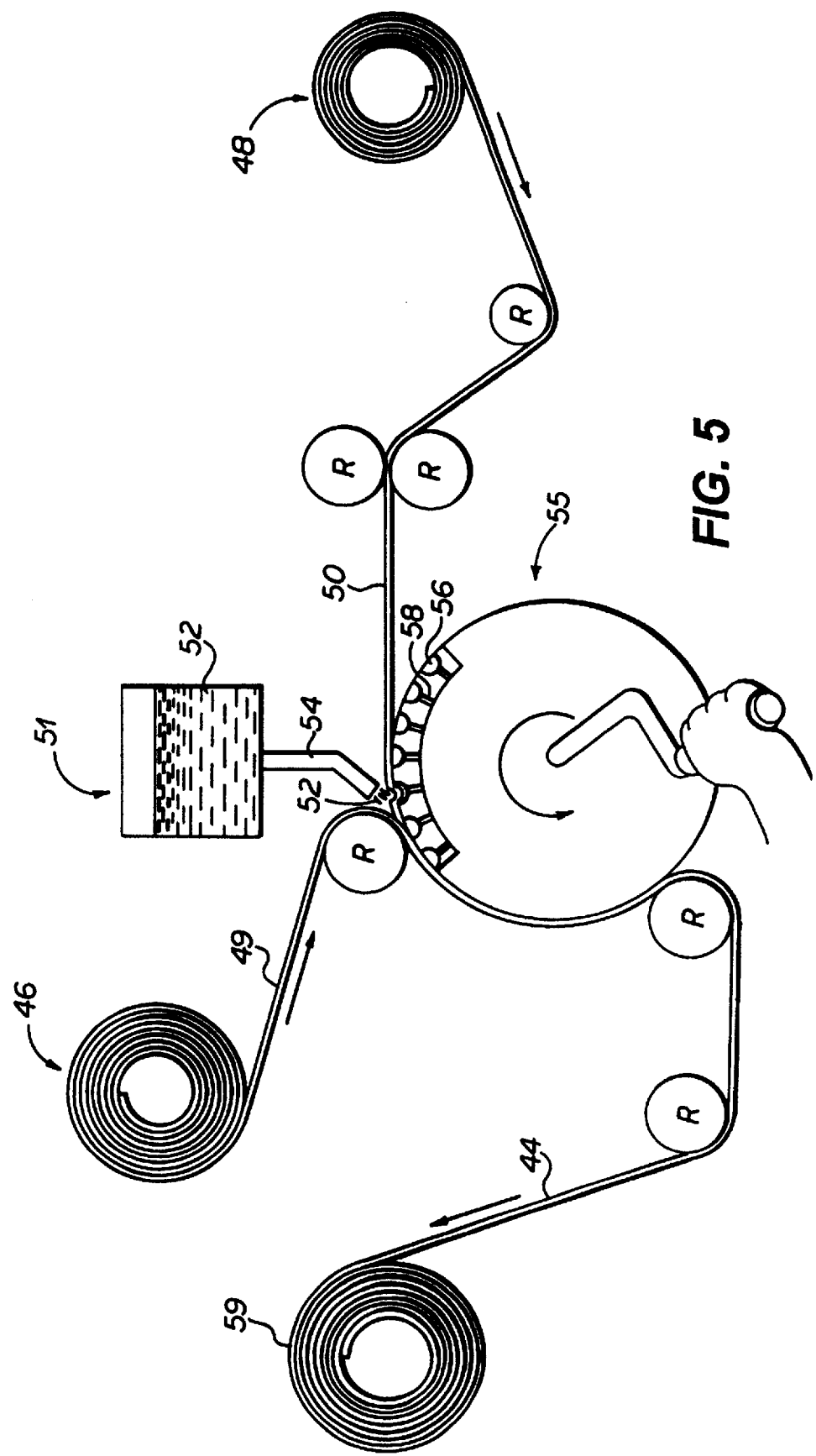
FIG. 5 is a side elevational view of a method for forming a sheet material having small pockets filled with liquid PCM.

Referring now in more detail to the drawings in which like numerals indicate like parts throughout the several views, FIG. 1 illustrates an insulation structure 10 that can be used above the wall board 11 that forms the ceiling, with the wall board having an upper surface 12 facing an attic or an area with relatively large temperature variations, and a lower surface 14 facing generally the inside of a building, which experiences relatively small temperature variations. Such a structure, as shown in FIG. 1, can also be used in a vertical external wall for insulation, which typically is exposed on one side thereof to relatively constant temperatures, and on the other side to variable temperatures which are higher than and lower than the constant temperature.

The insulation structure 10 normally is positioned between a pair of joists 15 and 16 and adjacent the upper surface 12 of the ceiling panel 11. In a preferred embodiment, the insulation structure 10 comprises a first thicker layer of insulative material 18 seated on the upper surface 12 of the ceiling 11, a second thinner layer of insulative material 19 mounted parallel to and in an overlapping relationship with respect to the first layer 18, and an intermediate layer 20 of PCM sandwiched between the facing surfaces of the first thicker layer of insulative material 18 and the second thinner layer of insulative material 19. The first thicker layer of insulation material 18 is usually placed adjacent the ceiling wall board 11 or an internal panel of a wall of a building, and the second thinner layer of insulation material 19 is placed facing exteriorly, such as facing an attic space 21 of the building. In addition, the layer of PCM 20 can comprise any of the embodiments discussed hereinafter. Preferably, the PCM is selected from materials with characteristics that will change phase between the anticipated highest and lowest temperatures of the variable temperature space during a particular time lapse.

An example of a phase change thermal insulation structure, with a temperature gradient applied thereto, is illustrated schematically in FIG. 2. During the hot hours of the day, as the PCM 20 within the layers of insulation changes state, it maintains a substantially constant phase changing temperature $T_c$, although it absorbs heat from or gives up heat to the outside surface of a ceiling or the outside surface of a wall structure $T_o$. Therefore, while the heat from a location outside of the wall or ceiling structure transfers through the second thinner layer of insulation and continues to be transmitted to the PCM layer during hot hours of the day, the layer of PCM moderates the temperature gradient across the first thicker layer of insulation by the substantially constant temperature conversion of sensible heat to latent heat, $T_c$, in the PCM layer while the PCM changes from a solid state to a liquid state. This is illustrated in full lines of FIG. 2. Once the PCM completely changes to a liquid state, the PCM will begin to increase in temperature and heat will begin to be transferred to the controlled temperature space $T_i$, such as interior living space 22, as the temperature gradient across the first thicker layer of insulation 18 increases. This is illustrated in upper dash lines of FIG. 2.

When the outside temperature $T_o$ drops to a level lower than the constant phase change temperature $T_c$, the PCM begins to change from a liquid to a solid, and maintains a constant temperature as illustrated in FIG. 2B, until the change of phase is completed. This is illustrated in the full lines of FIG. 2B. Once the PCM completely changes to a solid state, the PCM will decrease in temperature and heat will be transferred from the constant temperature space 22 to the outside, as illustrated in the lower dash lines of FIG. 2B.

The phase change material can be selected from a group consisting of: calcium chloride hexahydrate, glauber salt, paraffin (such as n-Tetradecane (C-14), n-Hexadecane (C-16), and n-Octadecane (C-18), olefin, $Na_2SO_4.10H_2O$, $CaCl_2.6H_2O$, $NaHPO_4.12H_2O$, $Na_2S_2O_3.5H_2O$ and $NaCO_3.10H_2O$, and other materials compatible with the function and purpose of the invention disclosed herein. Because the desired temperature of the interior living space 22 varies from season to season and according to individual taste/needs, it is preferable to use a PCM with a phase change temperature slightly higher than the average temperature of interior living space 22. Further, by selecting a PCM with a phase change temperature slightly above the average temperature of the controlled temperature space, the synergistic effect of the PCM and the layers of insulative material is enhanced, as will be evident from the following discussion.

In the embodiments disclosed herein of the present invention, the first layer of insulative material 18 and the second layer of insulative material 19 play an integral part of the insulation structure. The layers 18, 19 of thermal insulation can be selected from a group of insulation materials consisting of: fiberglass, mineral wool, urethane foam, cellulose, phenolic foam, polystyrene foam, styrofoam, isocyanide foam and sponge rubber. In choosing a suitable material for layers 18, 19, it is preferred that the R value of layer 18 is approximately two to four times that of the R value of layer 19. The R value of insulation indicates the ability of the material to prevent the transfer of heat. For example, a R value of "1" means that one square foot of the material transfers 1 btu of heat in one hour with a temperature gradient of 1° F. The stated R value ratio of layer 18, 19 often translates into the thickness of the respective layer since the same insulative material is most likely used for both layer 18, 19, though such is not required.

The choice of material for layer 18 having an appropriate R value is critical because layer 18 helps control the temperature of the interior living space 22 by insulating the interior living space 22 from the layer of PCM 20 since the phase change temperature of the chosen PCM is typically greater than that of the interior living space 22. The choice of R value for layer 19 is likewise critical because layer 19 buffers the heat from variable temperature attic space 21 which would otherwise dramatically shorten the time period in which the PCM is absorbing heat or giving up heat during respective phase changes. In addition, the greater the temperature swing in attic space 21 in a single temperature cycle, the greater R value required for layer 19 in order to enhance its buffering effect, assuming the same amount of PCM is utilized in layer 20. Conversely, if the R value for layer 19 is too great, it will inhibit the PCM in layer 20 from releasing the heat stored therein as the PCM changes from the liquid state to the solid state. Thus, it is the prudent selection of a suitable PCM and respective R value for layers 18 and 19 which synergistically produces a more efficient insulation structure 10.

FIG. 3 illustrates a method of forming one embodiment 24 of the intermediate PCM layer 20, as shown in FIG. 2. This method comprises moving lengths of an absorptive material 25 from an absorptive material source 26 with rollers 28 toward a phase change material bath 29 having PCM 30 in its liquid state therein. The PCM 30 in the bath 29 is heated, such as by heating coils (not shown) to maintain the temperature of the liquid PCM above its phase changing temperature so that it is always in liquid state. When the absorptive material 25 is fed into the liquid PCM bath 29, the material absorbs the PCM and becomes at least partially saturated with the PCM, rollers 32 move the material along and position it so that a cutting device 34 can separate segments 35 of the material at predetermined lengths. Meanwhile, bags or pouches 36 move in an opposite direction as the direction of the absorptive material and are positioned so as to allow the cut segments 35 to be conveniently placed in the bags 36 and the bags are sealed about their segments 35 and used as the intermediate PCM layer of insulation.

FIG. 4 illustrates the insulation structure having the embodiment 24 of the intermediate PCM layer formed by the process of FIG. 3. As seen in FIG. 4, the sheets of PCM absorptive material 35 is contained within the bags 36 so as to form the intermediate PCM layer 24, which is shaped and configured to the dimensions between a pair of joists 38 and 39. Similar to FIG. 2, the insulation structure comprises a first thicker layer of insulative material 40, supported by a ceiling board 41, and a second thinner layer of insulative material 42. The PCM intermediate layer 24, therefore, is sandwiched therebetween. In addition, the absorptive material 35, which normally is at least partially saturated with liquid PCM, can consist of cellulosic materials, sponge materials, and other materials.

In a retrofit situation, the PCM layer can be placed directly on the old layer of insulation, across the exposed surfaces of the joists, with an upper layer of fiberglass, etc. placed over the PCM.

FIG. 5 illustrates a method of forming other embodiments 44 and 45 (FIGS. 6 and 7) of the intermediate PCM layer of the insulation structure. The method shown in FIG. 5 comprises two sheets of material 49 and 50 and the sheets of material are advanced along their lengths from a supply 46 and 48 respectively toward each other by means of rollers, which are generally designated by the letter "R." A heated tank 51 maintains liquid PCM 52 at a temperature above its phase changing temperature, wherein a predetermined quantity of liquid PCM 52 is dispensed through a nozzle 54 in a timed sequence. Both sheets of material 49 and 50 and the nozzle 54 all generally converge at one location adjacent a heated vacuum roller 55 having cavities 56 in the outer periphery of the roller 55. Therefore, as a vacuum in the roller 55 draws air from the cavity 56 through a neck portion 58 so that when the sheet material 50 lies directly over the cavity, the vacuum tends to draw the sheet material 50 into the cavity so as to form a depression in the sheet material for the liquid PCM 52 to be located when ejected by the tank nozzle 54. The heat of the vacuum roll 55 makes the sheet 50 pliable so that the vacuum can draw the sheet material into the pockets 56. Sheet material 49 then covers the depression having the liquid PCM ejected therein and forms a vacuum material for the "bubble pack" PCM intermediate layer. The sheet of material 49 is heat pressed onto the surfaces along the edge of the PCM filled cavity to seal the sheets 49 and 50 about each filled pocket of the sheet 50. Thus, the embodiments shown in FIGS. 6 and 7 can be formed in this manner, wherein the intermediate PCM filled material can be accumulated in a spiral reel for latter use as part of an insulation in the wall structure or can be applied in a continuing process through the inside layer and outside layer of the wall material. FIG. 6, for example, shows one of the embodiments formed by using the method of FIG. 5, and FIG. 7 shows another of the embodiments formed by the method of FIG. 5. However, the embodiment of FIG. 6 shows one sheet of the material 50 being flexible and the other overlying sheet 49 of materials to be generally inflexible, wherein FIG. 7 both sheets of material 49 and 50 are flexible material. The embodiments of FIGS. 6 and 7 are especially effective in reducing the transfer of heat through the wall or ceiling insulation structure because when the PCM intermediate layer is positioned between the first thicker and second thinner layers of insulative material, and the gaps 59 (FIG. 9) between the PCM filled bubbles or pockets form air spaces in the intermediate layer of the insulation system. Therefore, the air spaces 59 are able to retard the movement of heat through the first or second insulative layers by having a capacity to store substantially weightless air in the air gaps 59 which aid the PCM to become a more efficient overall insulating structure.

FIG. 8 illustrates a method of forming a prefabricated insulation structure of the present invention having all of its components already connected so that the finished product can be directly installed in a ceiling or wall structure. A first reel 60 carrying a first thicker insulation material 61 is moved in one direction, wherein a second reel 62 carries a backing material 64 for supporting the insulation system when it is in its finished stage. The backing material 54 moves through a tank 65 having a liquid adhesive means 66 therein for coating the side of the backing material which is to meet and line the underside of the first thicker insulative material 61. A third reel 67 carrying sheets of PCM-filled material moves through a tank 69 filled with adhesive means 70 so as to coat both sides of the PCM intermediate layer 68, wherein its bottom side can be adhered to the first layer of insulative material 61 and its top layer can be adhered to a second layer of insulative material 71 which is dispensed by reel 72. The second layer of material 71 is usually thinner than the first layer 61 and is normally positioned adjacent an area with temperature fluctuations. A vacuum head 74 is supported at a position along the processing path after the second thinner layer of insulative material 71 has been applied onto the intermediate layer of PCM material 68 so as to clean off stray particles of insulative material, such as fiberglass particles. Finally, the finished product 75 is rolled onto a reel for subsequent use between a pair of joists 76 and 78 as shown in FIG. 9. FIG. 9, therefore, shows the finished product 75 of FIG. 8 in position above a ceiling wall board 80.

FIG. 10 shows yet another embodiment of the insulation structure 81 positioned between joists 82 and 84, wherein the insulation structure 81 rests on top of a ceiling board 85. The embodiment 81 comprises a thicker first layer 86 of insulative material, similar to the first layers of the other embodiments. An outer layer 88 comprises a thin reflective sheet 87 of material such as foil material for use in building structures which are typically exposed to high temperatures. The insulation system of this embodiment 81 illustrates a highly efficient system, wherein heat is initially reflected off of the outer surface of reflective material 87 and then when some heat penetrates the outer layer 88, the PCM-filled bubbles 89 use or "absorb" some of the heat in order to change phase, thereby reducing the heat that would otherwise transfer through the ceiling board 85 to a temperature-controlled area 91. In addition, the composition of the PCM material can be adjusted for use in a high temperature environment such as by selecting a PCM material with a higher phase changing temperature or by mixing difference phase changing materials to form a material that will change phase faster.

FIGS. 11 and 12 illustrate a method 94 for forming another embodiment 92 of an insulation system, wherein the insulation structure extrudes insulation foam board 95 having a plurality of pellets 96 filled with phase change material 97 dispersed therethrough. If the material of the foam board does not adequately encapsulate the PCM, an encapsulation material can be used. The method 94 comprises a pair of concentric nozzles 100 and 101, wherein one nozzle encircles the other, as most clearly seen in FIG. 12. The inner nozzle with the smaller diameter 100 releases a supply of PCM beads 97, while the outer nozzle with the larger diameter 101 releases a supply of encapsulating material 102, which is synchronized to be pulsed out and around the PCM bead 97 immediately before being exposed to an exterior surface of the wall board 95.

The encapsulating material 102 can comprise a sealing material, such as oil, tar, or epoxy which fully encapsulates the PCM bead 97. With the embodiment 92 of the insulating structure positioned in a wall structure of a building, the PCM 97 would behave in the same manner as the above-described embodiments, by retarding the transferred heat between an area of relatively constant temperature and an area having variable temperatures. In addition, this embodiment disperses the PCM-filled pellets 96 uniformly through the wall board by dispensing the pellets 96 continually by moving the wall board in one direction. Such an embodiment aids the overall efficiency of the insulation system.

Figure 13:
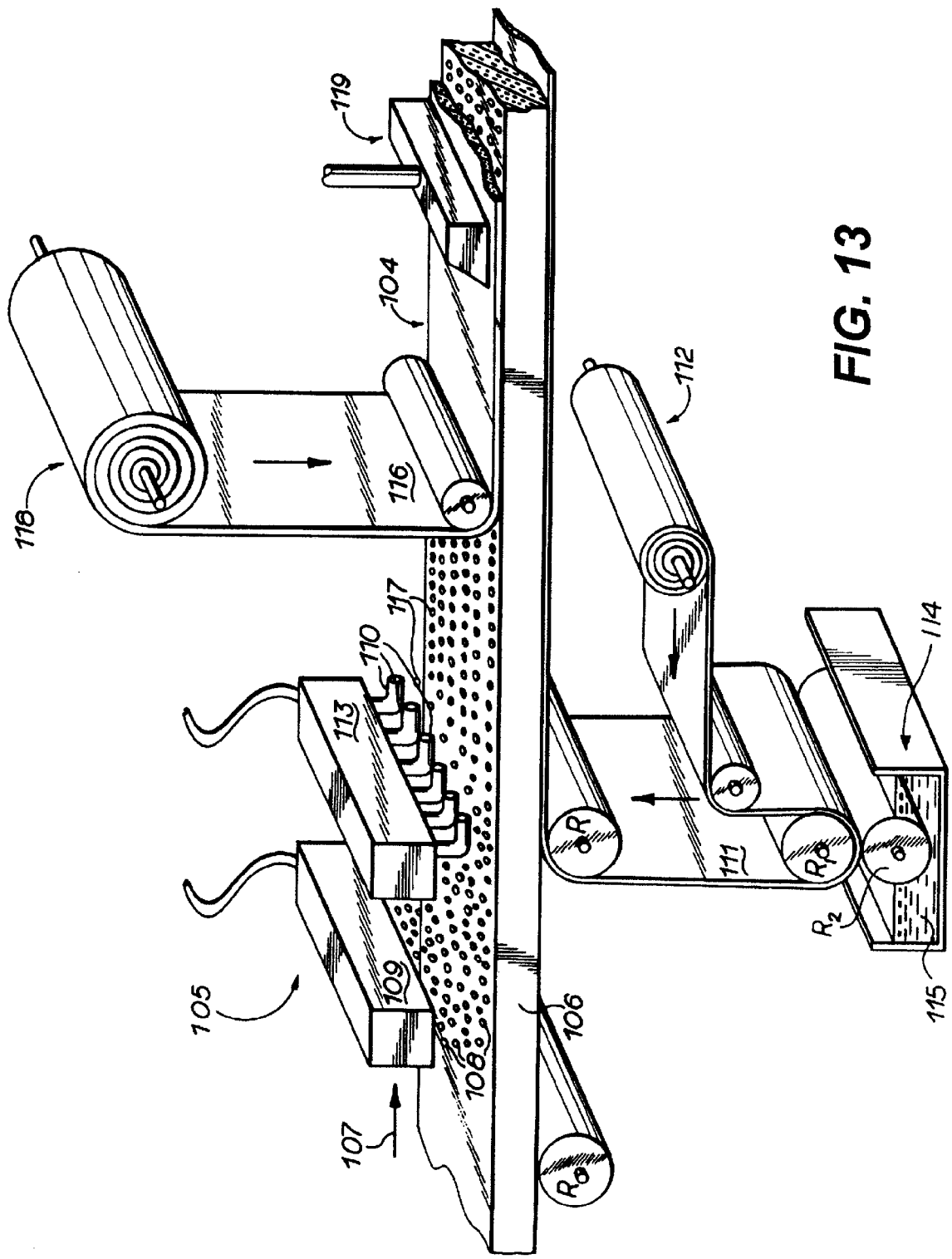
FIG. 13 is a perspective view of a method for forming a phase change insulation structure of the present invention showing PCM beads dispersed as an intermediate layer.

FIG. 13 illustrates a method 105 for forming another embodiment 104 of an insulation structure, wherein a first thicker layer of insulative material such as a fiberglass blanket 106 is moved by roller means, generally designated R in the direction of arrow 107. Liquid adhesive droplets 108 are evenly dispersed by an adhesive distributor 109 directly onto the first thicker layer of insulative material 106. At a next station, solid pellets 117 of phase-changed filled material are dispersed through a plurality of nozzles 110, extending from a pellet source 113 which spans the width of the first layer of insulative material 106. Simultaneously a backing material 111 is moved by roller means R from a backing material source 112 through a tank 114 filled with liquid adhesive means 115. As seen in FIG. 13, a lower roller means $R_2$ is partially immersed in the adhesive material 115 so as to transfer the liquid adhesive means 115 to the roller $R_2$. The roller $R_1$, moves the backing material 111 towards the roller $R_2$, wherein a doctor blade (not shown) squeezes the roller $R_2$ so as to remove the excess liquid adhesive from the roller $R_2$. When the two rollers $R_1$, and $R_2$ meet, the adhesive 115 from roller $R_2$ is transferred onto the backing sheet on roller $R_1$. After the adhesive means 115 has been applied to the backing material 111, the backing material 111, when joined with the first thicker layer of insulative material 106, will adhere thereto. Similarly, when the PCM-filled pellets 117 are distributed on the sheet 106 with the adhesive droplets 108, the PCM-filled pellets become adhered to the first thicker insulative material 106. Finally, a second thinner layer of insulative material such as a fiberglass blanket 116 moves from its source 118 over the PCM-filled pellets 117 and the adhesive droplets 108, wherein the adhesive droplets 108 bond the second thinner insulative layer of material 116 to the first layer of thicker insulative material 106. A vacuum head 119 also can be positioned over the final product so as to induce a stream of air about the product and clean the surface of the second thinner layer of insulative material 116 of any particles so that the final product can be cut into segments and packed for immediate use in a building structure.

Figure 14:
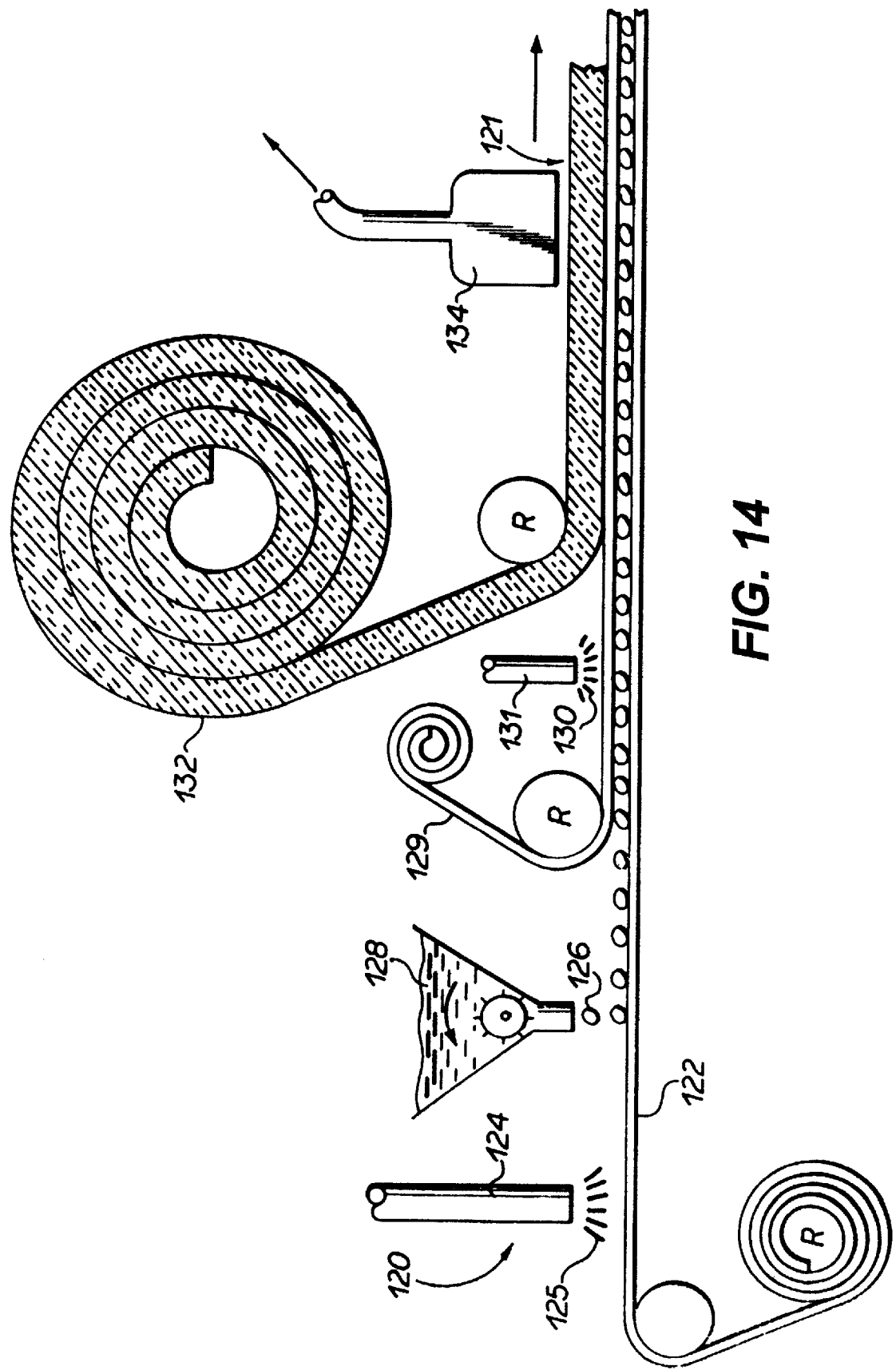
FIG. 14 is a side elevational view of another method for forming a phase change insulation structure.

FIG. 14 illustrates another structure 120 of forming another embodiment 121 of the insulation structure of the present invention, wherein a single sheet of backing material 122 such as aluminum foil is moved by means of a roller toward an adhesive spray station 124 which sprays liquid adhesive means 125 on the vacuum material 122. At the next station, PCM-filled beads 126 are then distributed from its source 128 over the foil backing sheet 122 and the liquid adhesive spray 125 positioned thereon, so that the PCM-filed beads 126 are bonded to the backing sheet 122. Another sheet of flexible material 129 is positioned over the PCM-filled beads 126 and overlies the backing sheet of material 122. Second liquid adhesive 130 is then dispensed from its source 131 over the flexible sheet of material 129. Finally, a layer of insulative material such as a fiberglass blanket 132 is moved over and bonded to the flexible sheet of material 129 by the liquid adhesive 130. Similar to the system shown in FIG. 13, a vacuum head 134 is positioned over the final product so as to induce a stream of air about the upper layer of material and to remove any loose insulative particles of fiberglass, which might be harmful to a work person. The work product then can be cut and packed in segments so that the composite insulation blanket is already assembled and ready to be placed directly in a ceiling or wall structure.

FIG. 15 illustrates another embodiment 140 of the insulation structure of the present invention, shown above a wall board 141 which forms the ceiling. The wall board 141 has an upper surface 142 facing an attic or an area with relatively larger temperature fluctuations, and a lower surface 144 facing the inside of a building, which normally is maintained at a generally constant temperature. The insulation structure 140 is placed between a pair of joists 145 and 146 and adjacent the upper surface 142 of the ceiling panel 141. A first thicker layer of insulative material 148 is seated on the upper surface 142 of the ceiling 141, and a second thinner layer of insulative material 142 is mounted parallel to and in an overlapping relationship with respect to the first layer 148. In addition, two layers of material 150 and 151 having PCM therein are sandwiched between the first layer 148 and the second layer 149 of insulative material. As seen in FIG. 15, the two layers of PCM material 150 and 151 are similar to the PCM material shown in FIG. 6, wherein backing material 152 and 154 supports a plurality of PCM-filled bubbles 155.

The embodiment 140 shown in FIG. 15 provides yet another layer of PCM material in the intermediate layer of the insulation structure for higher insulative capacity. With the PCM bubbles facing each side of the insulation material 148 and 149, heat transferring through either layer of insulation must first be absorbed by one layer of the PCM material, then the excess heat can be absorbed by the other layer of PCM material. Obviously, any of the embodiments of the PCM material can be layered to create this dual-barrier effect. Moreover, the intermediate layer can comprise even three or four layers of insulative material.

Figure 16:
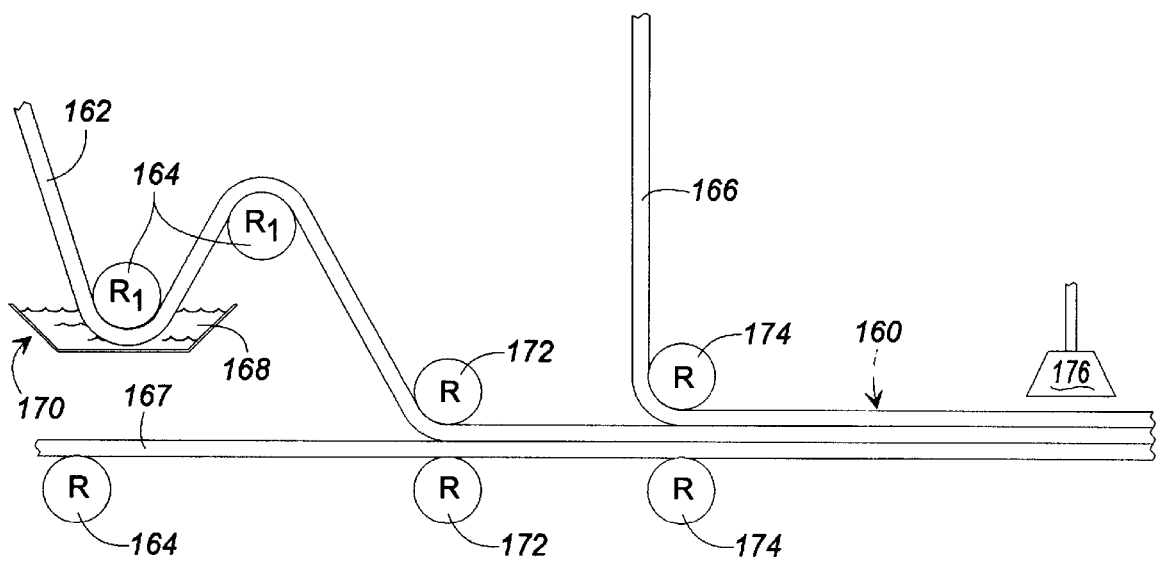
FIG. 16 is a side elevational view of a method for forming another embodiment of the insulation structure of the present invention wherein the PCM is directly applied to a layer of support material.

FIG. 16 illustrates a method for forming another embodiment 160 of the intermediate layer 20 of the insulation structure 10, as shown in FIG. 1. This method comprises moving lengths of an intermediate support material 162 (preferably an insulative material), a first thicker layer of insulative material 167, and a second thinner layer of insulative material 166 toward one another with rollers 164 in a converging arrangement. A PCM solution 168 in the a bath 170 is heated, such as by heating coils (not shown) to maintain the temperature of the liquid PCM solution 168 above its phase change temperature so that it is always in liquid state. In order to bond layers 162, 166, 167 together, a water-based glue is added to PCM solution 168. Further, a fire retardant such as boric acid, bromine, or chlorine is added to PCM solution 168 to counteract the natural flammability of some PCM's. It has been determined that it is preferable to prepare PCM solution 168 as a homogenous mixture comprising, by weight, 40% PCM, 40% glue, and 20% fire retardant. However, it can be appreciated by one skilled in the art that a suitable PCM solution 168 can comprise numerous other possible formulations. The glue utilized in the preferred embodiment is a water-based glue such as Bond Master, commercially available from National Starch and Chemical Corp., New Jersey, U.S.A., and the fire retardant utilized is boric acid. T$_o$enhance the mixing characteristics of PCM solution 168, a water in oil emulsifier which will not destroy the affect of the PCM is added to PCM solution 168.

As the support layer 162 is drawn through bath 170, PCM solution 168 substantially saturates or coats support layer 162. Worth noting at this point is that the particular PCM used in PCM solution 168 and the material comprising support layer 162 must be carefully selected such that the PCM is sufficiently adhesive in nature and the material of the support layer is sufficiently porous so that the PCM is retained in a substantially uniform dispersement within the intermediate support layer 162. As an example, fiberglass insulation and various paraffins such as, but not limited to n-Octadecane (C-18), n-Hexadecane (C-16), and n-Tetradecane (C-14), have been determined to be a preferable combination of materials. The portion of support material 162 coated with PCM solution 168 is advanced into contact with and adhered to a layer of insulative material, such as layer 167, by squeeze rollers 172, as shown in FIG. 16. Next, a second layer of insulative material, such as layer 166, is applied and adhered to the opposite surface of support layer 162 by squeeze rollers 174, as shown in FIG. 16. Thus, as the water based glue evaporates, the layers 162, 166 and 167 are bonded together to form insulation structure 160. A vacuum head 176 is supported at a position along the processing path after the second layer of insulative material 166 has been applied onto the intermediate layer of support material 162 coated in PCM solution 168 so as to clean off stray particles of insulative material. Finally, the finished product 160 is rolled onto a reel for subsequent use in the wall or ceiling structure of a building as previously discussed in regard to the aforementioned embodiments.

Figure 17:
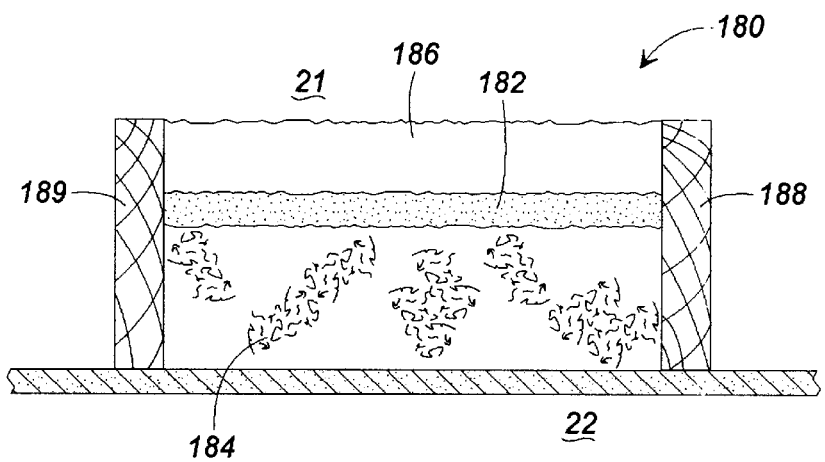
FIG. 17 is an end cross sectional view of adjacent ones of the attic joists in a ceiling structure illustrating an alternative embodiment of a the phase change thermal insulation structure, wherein the intermediate PCM layer is incorporated into one or more of the layers of insulation material.

Another alternative embodiment of insulation structure 10 of the present invention is insulation structure 180, as illustrated in FIG. 17. Insulation structure 180 is substantially similar to insulation structure 10, illustrated in FIG. 2, with the exception that an intermediate layer of PCM 182 is incorporated into one or more of the abutting or facing portions of either a first thicker layer of insulative material 184 or the second thinner layer of insulative material 186. For instance, in FIG. 17, the intermediate layer 182 is shown incorporated into first thicker layer 184. This configuration of an insulation structure 180 in accordance with the present invention generally can be fabricated at a lower cost per unit length than the foregoing embodiments of insulation structure 10 while providing the same thermal insulative performance characteristics described hereinbefore in reference to insulation structure 10. Worth noting, however, is that insulation structure 180 requires a non-evaporating PCM since it will be exposed to the atmosphere.

In essence, intermediate layer of PCM 182 is produced by directly applying or coating one or more of the facing surfaces of either first insulation layer 184 or second insulating layer 186 with a PCM. For the purpose of illustrating insulation structure 180 of the present invention, the insulation material of layers 184, 186 utilized in the following embodiments is fiberglass, though it can be appreciated that other similar insulative materials, as previously listed, would likewise be suitable.

Figure 18:
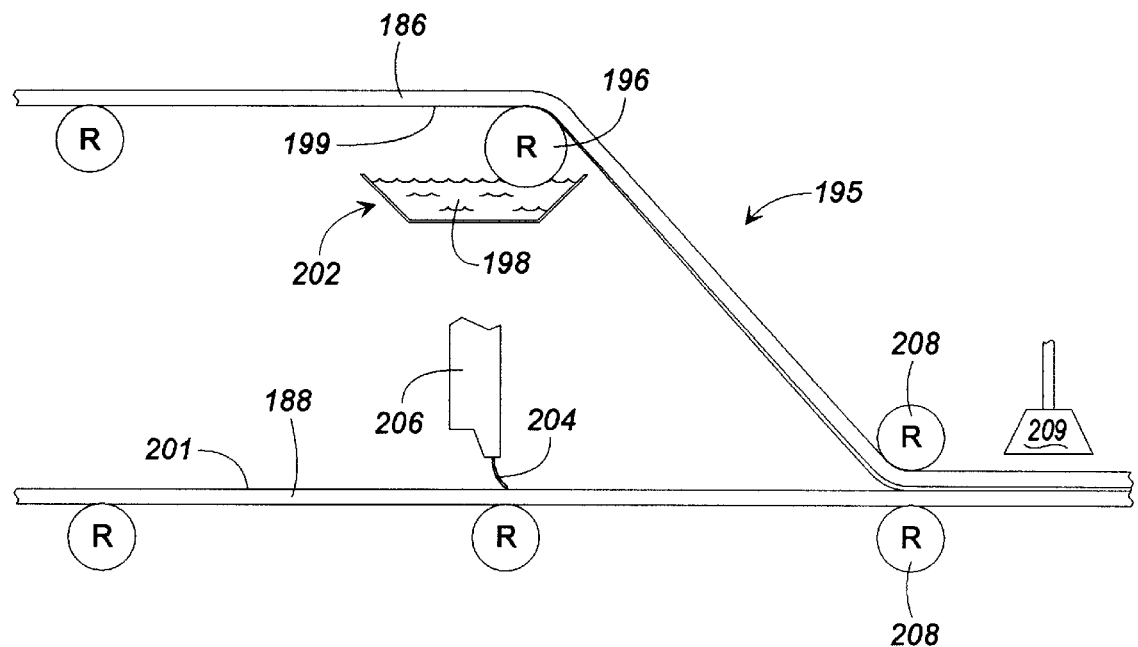
FIG. 18 is a side elevational view of a method for forming the insulation structure of FIG. 17.
Figure 19:
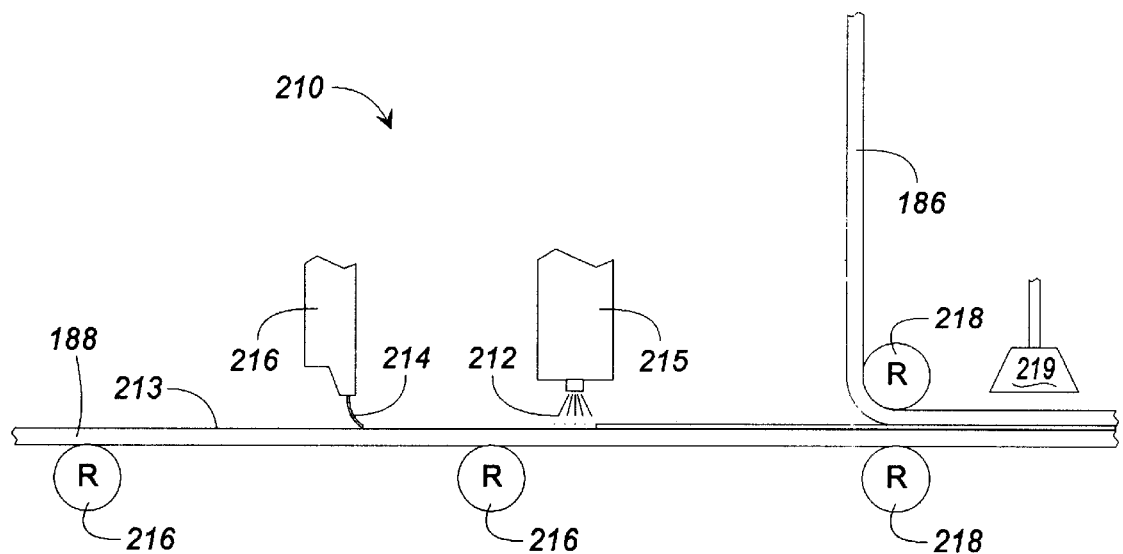
FIG. 19 is a side elevational view of another method for forming the insulation of FIG. 17.

Though it can be appreciated by one skilled in the art that there are numerous methods for coating a portion of a layer of insulative material adjacent to a surface with a PCM, for instance, spraying, rolling, sprinkling or soaking, only two such methods are described herein, as illustrated in FIGS. 18 and 19. FIG. 18 illustrates a roller method 195 whereby a roll applicator 196 delivers a PCM solution 198 in a liquid state from a heated bath 202 to a surface 199 of insulating material 186. The PCM solution 198 can be applied uniformly about surface 199 or in discrete parallel strips along the length of layer 186. It has been determined that a desirable coating of PCM solution 168 is approximately 5–6 ounces per square foot. Further, it is preferred that PCM solution 198 contain a fire retardant as previously stated. Applied to a surface 201 of insulating material 188 is one or more strips of glue or adhesive material 204 extruded from nozzle 206 in any desired pattern. For example, strips of glue 204 can be configured to overlap the portions of surface 199 of layer 186 coated in PCM solution 198 or to align with the portions not coated in situations where PCM solution 198 is applied in strips. Alternatively, as previously noted, glue 204 may be incorporated into PCM solution 198 so that they may be applied simultaneously. The respective surfaces 199, 201 of layers 186, 188 are then brought into contact by squeeze rollers 208 and bonded together. A vacuum head 209 is supported at a position along the processing path after the layers of insulative material 184, 186 have been bonded so as to clean off stray particles of insulative material, such as fiberglass particles. Lastly, the finished product is rolled onto a reel for subsequent use in the wall or ceiling structure of a building, as shown in FIG. 17.

FIG. 19 illustrates a method 210 whereby a controlled amount of a PCM solution 212 in a liquid state is sprayed by nozzle 215 onto a surface of layer of insulative material, such as surface 213 of layer 188. Strips of glue 214 are also applied in any desired pattern via nozzle 216 to a surface of a layer of insulative material, such as surface 213 of layer 188. The applied patterns of glue 214 and PCM solution 212 may take numerous forms as previously discussed in reference to method 195 described in the preceding paragraph. Alternatively, glue 214 may be incorporated into PCM solution 212, as also may a fire retardant, so that they may be applied simultaneously. As layer 186 is advanced by rollers 216 and after PCM solution 198 and glue 214 are applied thereto, a layer of insulation material 186 is brought into contact with surface 213 of layer 188 by squeeze rollers 218 so as to bond layers 186, 188 together. A vacuum head 219 is supported at a position along the processing path after the layers of insulative material 184, 186 have been bonded so as to clean off stray particles of insulative material. The finished product is then rolled onto a reel for subsequent use in the wall or ceiling structure of a building as shown in FIG. 17.

In addition, PCM solution 212 may be applied to layer 188 in a solid state, preferably in a particulate or bead format, and subsequently heated to a temperature above the phase change temperature of the particular PCM so as to transform the PCM from a solid state into a liquid state, and thus allowing it to substantially uniformly coat a portion of layer 188 adjacent surface 213. The heating of the PCM can occur prior to or after the bonding together of layers 186, 188.

Another embodiment 220 of an insulating structure 180 in accordance with the present invention incorporates an intermediate layer of PCM into a single batt of insulative material. Illustrated in FIGS. 20 and 21 are two systems for forming embodiment 220 wherein a PCM solution is introduced into a single batt of insulation material either during the fabrication of the insulation layer (FIG. 20) or in a post-fabrication process (FIG. 21).

Figure 20:
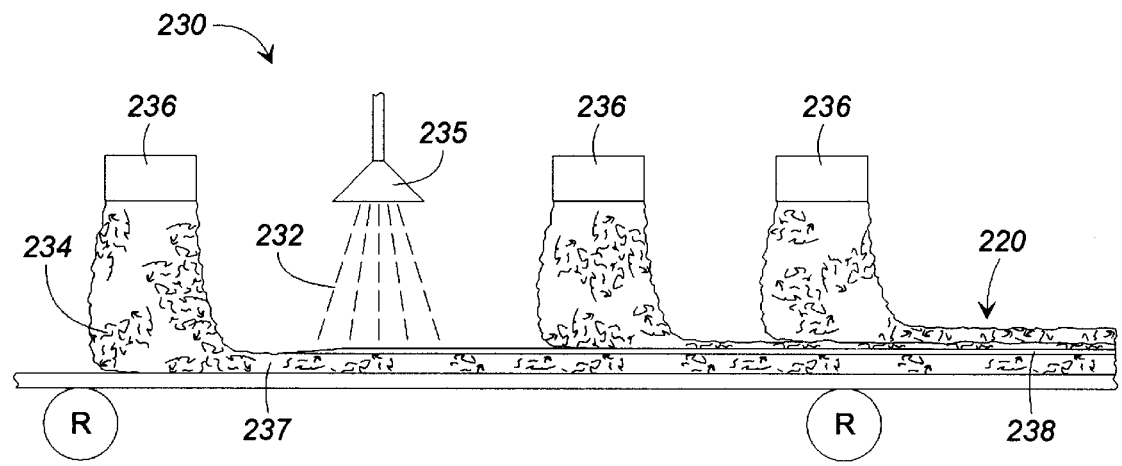
FIG. 20 is a side elevational view of another method for forming the insulation structure of FIG. 17, wherein the PCM is applied to an insulative layer during the fabrication of the layer of insulative material.

FIG. 20 illustrates a method 230 wherein a PCM solution 232 in a liquid state is applied directly to glass fibers of a partial batt 237 of fiberglass insulation as the batt of insulation is being fabricated. As molten glass 234 is emitted from a plurality of fiberglass spinners 236, a nozzle 235 interposed between adjacent spinners 236 sprays or sprinkles PCM solution 232 onto the partial batt 237 of fiberglass insulation forming an intermediate layer of PCM 238. Because of the relatively high temperature of the molten glass emitted from spinners 236, the molten glass is preferably cooled by a water mist (not shown) so that the PCM does not evaporate upon contact with the glass fibers of partial batt 237. Alternatively, the PCM may be applied in a solid state to partial batt 237 so that the heat from partial batt 237 or the heat from subsequent layers of molten glass applied thereto transforms the PCM into a liquid state. Once in a liquid state, the PCM substantially uniformly coats the glass fibers of the fiberglass batt comprising intermediate layer of PCM 238, just as if it were applied in a liquid state.

Figure 21:
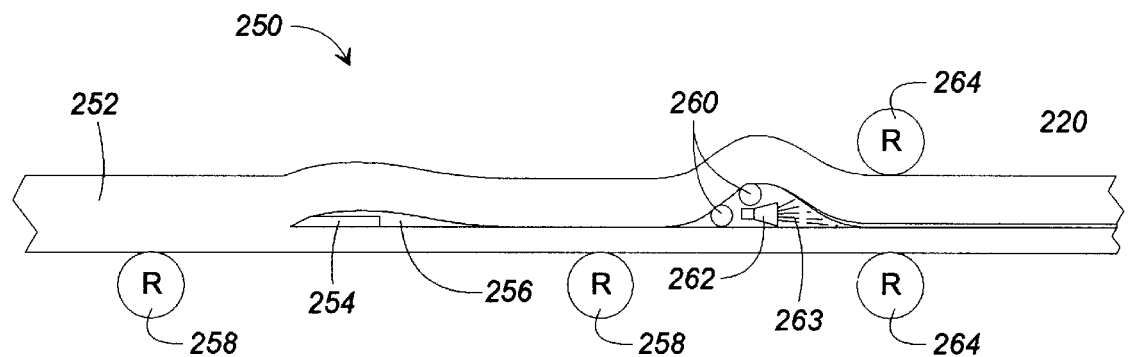
FIG. 21 is a side elevational view of yet another method for forming the insulation structure of FIG. 17, wherein the PCM is applied to a slit in a single layer of insulative material.

FIG. 21 illustrates a method 250 whereby a batt 252 of insulative material is horizontally split or sliced with a splitter 254, forming a slit 256 extending the width of batt 252. Splitter 254 may take many forms such as a band saw or sharp blade. As rollers 258 advance batt 252, one or more rollers 260 separate the respective layers of batt 252 divided by slit 256. Disposed downstream and adjacent from rollers 260 is an applicator 262 for directly dispersing a PCM solution 263 between respective layers of batt 252. Applicator 262 may comprise a nozzle for spraying PCM solution 263 in either a liquid or solid state or a roll applicator for rolling PCM solution 263 in a liquid state onto either or both of the surfaces of the layers of batt 252 defining slit 256. The respective layers of batt 252 are brought back together by rollers 264 so as to form embodiment 220 of insulative structure 180. As previously discussed, PCM solution 263 applied by applicator 262 preferably includes a mixture of PCM, glue and fire retardant as described herein before.

Further, PCM can be dispersed over existing insulation in a building structure, particularly in an attic, and then covered with additional insulation. A color dye can be added to the PCM to ensure the existing insulation is completely and substantially uniformly covered.

In all the above-described embodiments, the type or quantity of PCM used can be selected to accommodate a specific environment. For example, different types of PCM material can be mixed together or different layers of PCM material can be used to control the transfer of heat through the structure. However, it is necessary that each phase change material undergo a change of state in order that the phase change material absorbs or gives up heat to shield the inner layer of insulative material and subsequently the ceiling or wall adjacent the temperature controlled space.

While the invention has been disclosed in the form and shape of an insulation system for a ceiling or wall structure, it should be apparent to those skilled in the art that similar structures can be utilized for walls and ceilings for mobile homes and industrial buildings, and for use in internal wall structures where one space has a continuing shift in temperatures and the other space is maintained in a substantially constant temperature.

It will be understood that the foregoing relates only to preferred embodiments of the present invention, and that numerous changes and modifications may be made therein without departing from the spirit and scope of the invention as set forth in the following claims.

Wherefore, the following is claimed:

1. A thermal insulation structure for a building structure for placement in heat exchange relationship between a substantially constant temperature space normally maintained at a generally constant predetermined temperature and a variable temperature space normally of a variable temperature within a range of temperatures extending higher than and lower than the temperature of the generally constant temperature space during a time cycle, comprising:

a first layer of heat insulation material having first and second opposed surfaces, said first surface to be arranged to face the constant temperature space of the building structure, a second layer of heat insulation material having first and second opposed surfaces, said first surface of said second layer of insulation material overlying said second surface of said first layer of insulation material and said second surface of said second layer to be arranged to face the variable temperature space of the building structure, an intermediate layer of phase change material generally uniformly coated in a liquid form on at least one of said facing surfaces only of said first and second layers of insulation material, wherein interior portions of said first and second layers are substantially free of said phase change material, said phase change material comprising a material that changes between a solid state and a liquid state at a predetermined phase change temperature, said phase change temperature falling within said range of temperatures of the variable temperature space during a time cycle, said first layer of insulation material having greater heat insulation value than said second layer of insulation material and said phase change material being arranged to more readily exchange heat with said variable temperature space than the constant temperature space when the thermal insulation structure is placed in a building structure and the temperature of the variable temperature space becomes higher than or lower than the phase change temperature.

2. The thermal insulation structure of claim 1 and wherein the layer of insulative material to which the phase change material is coated is selected from a group of porous heat insulation materials consisting essentially of: fiberglass, mineral wool, urethane foams, expanded poly-styrene foam, styrofoam, cellulose, thermax, and sponge rubber.

3. The thermal insulation structure of claim 1 and wherein said phase change material is a paraffinic hydrocarbon.

4. The thermal insulation structure of claim 1 and wherein said phase change material is selected from a group consisting essentially of: n-Octadecane (C-18), n-Hexadecane (C-16) and n-Tetradecane (C-14).

5. The thermal insulation structure of claim 1 and wherein said phase change material is selected from a group of phase change materials whose phase changing temperature is greater than the generally constant predetermined temperature of the constant temperature space.

6. The thermal insulation structure of claim 1 and wherein the phase change material moderates a temperature gradient across said first layer of insulative material.

7. The thermal insulation structure of claim 1 and wherein said phase change material is fire retardant.

8. A thermal insulation structure for use in combination with a building structure having an attic and ceiling structure for defining a dwelling space below said attic, said thermal insulation structure including a first layer of heat insulation material in contact with the ceiling structure and a second layer of heat insulation overlying said first layer of insulation, and phase change material coated in a liquid form onto at least one of a surface only of said layers of heat insulation material and positioned between said first and second layers of heat insulation material, wherein interior portions of said first and second layers are substantially free of said phase change material, said phase change material having a phase change temperature between a high temperature and a low temperature of the attic in a twenty-four hour day, said first layer of heat insulation material having a higher insulation value than said second layer of heat insulation material so that heat is transferred more readily to and from said phase change material through said second layer of insulation material than through said first layer of insulation material and said phase change material moderates a temperature gradient across said first layer of heat insulation material.

9. The thermal insulation structure of claim 8 and wherein said phase change material is directly applied to a layer of said heat insulation material.

10. In a building structure having a constant temperature space, a variable temperature space adjacent said constant temperature space which has high and low temperatures in a time period, a wall structure positioned in heat exchange relationship between said constant temperature space and said variable temperature space, said wall structure including at least one layer of heat insulation material facing said constant temperature space and a layer of phase change material directly applied in a liquid form to a portion of a facing surface only of said layer of heat insulation material and facing said variable temperature space and in better heat exchange relationship with said variable temperature space than said constant temperature space, wherein an interior portion of said insulation layer is substantially free from said phase change material, said phase change material having a phase change temperature between the high and low temperatures of the variable temperature space in the time period, so that heat is transferred more readily between said phase-change material and said variable temperature space than between said phase change material and said constant temperature space and the phase change material changes phases in response to the change of temperature of the variable temperature space and shields the constant temperature space and the layer of insulation material from the changes of temperature of the variable temperature space during the change of phase of the phase change material.

11. A layer of fibrous thermal insulation material for use in combination with an external wall structure of a building structure, said external wall structure positioned in heat exchange relationship between a substantially constant temperature space inside the building structure and a space external to the building structure open to the atmosphere and to changing temperatures of the atmosphere, the improvement therein of said layer of fibrous insulation material having opposed surfaces and a substantially uniform coating of phase change material directly applied in a liquid form to and supported by at least a portion of the fibers of said insulation material at one of said opposed surfaces only for facing the variable temperature space, wherein an interior portion of said insulation layer is substantially free from the phase change material with less insulation positioned between the phase change material and the variable temperature space than between the phase change material and the constant temperature space, said phase change material having a phase change temperature between the high and low temperatures of the variable temperature space so as to moderate the transfer of heat between the variable temperature space and the layer of fibrous insulation material when the atmospheric temperature passes the phase change temperature of the phase change material and the phase change material changes phase.

12. The fibrous thermal insulation material of claim 11 and wherein said insulative material is configured as a batt having a width and length, said batt including a slit the length of said batt spanning said width of said batt, said slit separating said batt into at least two layers, and wherein said phase change material is uniformly applied to said batt at said slit between said two layers.

* * * * *